United States Patent [19]
Kataoka et al.

[11] Patent Number: 5,226,613
[45] Date of Patent: Jul. 13, 1993

[54] PHOTOGRAPHIC FILM CASSETTE

[75] Inventors: Hideaki Kataoka; Kiichiro Kitagawa, both of Kanagawa, Japan

[73] Assignee: Fuji Photo Film Co., Ltd., Kanagawa, Japan

[21] Appl. No.: 721,000

[22] Filed: Jun. 27, 1991

[30] Foreign Application Priority Data

Jul. 9, 1990 [JP] Japan .................. 2-180993
Dec. 20, 1990 [JP] Japan .................. 2-412415

[51] Int. Cl.⁵ .......................... G03B 17/26
[52] U.S. Cl. ......................... 242/71.1; 242/71.8
[58] Field of Search ............ 242/71, 71.1, 71.7, 242/71.8, 71.9; 354/275; 352/72, 75, 78 R

[56] References Cited

U.S. PATENT DOCUMENTS

| | | | |
|---|---|---|---|
| 2,336,278 | 12/1943 | Mihalyi | 242/71 |
| 2,360,255 | 10/1944 | Mihalyi | 242/71 |
| 2,364,381 | 12/1944 | Mihalyi | 242/71 |
| 2,521,935 | 9/1950 | Monroe | 227/81 |
| 2,552,200 | 5/1951 | Mihalyi | 242/71 |
| 3,467,340 | 9/1969 | Rosenburgh | 242/197 |
| 3,556,435 | 1/1971 | Wangerin | 242/210 |
| 3,627,229 | 12/1971 | Wangerin | 242/210 |
| 3,627,230 | 12/1971 | Wangerin | 242/210 |
| 3,677,499 | 7/1972 | Wangerin | 242/210 |
| 3,797,777 | 3/1974 | Hosono et al. | 242/197 |
| 4,834,306 | 5/1989 | Robertson et al. | 242/71.1 |
| 4,899,948 | 2/1990 | Niedospial, Jr. et al. | 242/71.1 |
| 4,962,401 | 10/1990 | Takahashi | 242/71.1 X |
| 5,003,334 | 3/1991 | Pagano et al. | 354/275 |
| 5,126,774 | 6/1992 | Loewe et al. | 242/71.1 X |
| 5,174,519 | 12/1992 | Oi et al. | 242/71.1 |

FOREIGN PATENT DOCUMENTS 2921379 11/1980 Fed. Rep. of Germany.

Primary Examiner—Daniel P. Stodola
Assistant Examiner—John P. Darling
Attorney, Agent, or Firm—Sughrue, Mion, Zinn, Macpeak & Seas

[57] ABSTRACT

A pair of flanges are rotatably and pivotably support on a spool of a film cassette near its two ends for defining positions of both lateral edges of photographic film. Each flange consists of a disk and a circumferential lip. A pair of lips are formed on the disks in the flanges along peripheries thereof and project face to face with each other for contact with edges of an outermost turn of the film. The film is prevented from loosening by the lips. Ridges inside a cassette shell force the flanges to pivot, with respect to the axis of rotation of the spool, against the film wound in a roll. Both side faces of the film wound in a roll are partly clamped in a state with the flanges out of the vertical relative to the spool. Both lateral sides of a leading end portion of the film are cut off. An interval between the lateral edges of the film is smaller than a minimum interval between opposing circumferential edges of the lips. In a preferred embodiment, a pair of projections are formed on an inside of the cassette shell near the film passageway for projecting to be in contact with the circumferential edges of the lips, and keep the flanges out of the vertical in addition to the ridges.

23 Claims, 4 Drawing Sheets

PHOTOGRAPHIC FILM CASSETTE

BACKGROUND OF THE INVENTION

1. Field of the Invention

The present invention relates to a photographic film cassette, more particularly to a self-advancing photographic film cassette in which rotation of a spool causes photographic film to advance to the outside of a cassette shell.

2. Description Relative to the Prior Art

A known film cassette includes photographic film positioned so that the film leader does not protrude from the cassette shell prior to loading the cassette in a camera. Such a film cassette is easily loaded into a camera. Simple feeding mechanisms are used with the latter type of film cassette and include a construction which rotates the spool to unwind the film, thereby causing the leads to move through a film passageway and exit the cassette. A film cassette disclosed in U.S. Pat. No. 4,834,306 has a spool provided with rotatable flanges on both lateral sides of the film wound in a roll. Each flange consists of a disk and a circumferential lip. Lips are formed on the periphery of the disks to project in the direction along the length of the cassette. Spreading projections are formed on the inside of the cassette shell in positions where the film is directed to the film passageway for deforming the flanges outwardly to widen the interval between the flanges. The spreading projections continuously spread the flanges in the positions close to the film passageway so as to release the outermost turn of the film from contact with the lips. Therefore, the film leader is advanced to exit the cassette through the film passageway by rotating the spool in the direction to unwind the film.

However, the film cassette described in the above U.S. Pat. has a disadvantage in that the flanges cannot recover their initial shape, because the continuous deformation of the flanges by means of the spreading projections gives rise with time to a creep of the flanges, though the deforming load is considerably small. If the flanges become permanently deformed, the lips of the flanges might not cover the edges of the outermost turns of the film, and this may cause the film to be so loosened that film leader will not advance when the spool is rotated. There is also a problem of a large friction between the contact surfaces of the spreading projections and the flanges spread by the spreading projections. A large load applied to the spool causes necessity of a camera having a film feeding mechanism capable of providing a large torque for rotating the spool, of which the manufacturing cost might be enlarged.

SUMMARY OF THE INVENTION

It is therefore an object of the present invention to provide a film cassette capable of preventing the film in a roll from loosening without irrecoverable deformation of the flanges on the spool supporting the film.

It is another object of the present invention to provide a film cassette moving a spool which can be rotated by applying a small rotary torque thereto.

In order to achieve the above and other objects and advantages of this invention, a photographic film cassette comprises: a cassette shell provided with a film passageway through which the film is passed; a spool disposed in the cassette shell for winding the film in a roll; a pair of flanges rotatably provided on the spool in positions close to both ends of the spool for defining positions of both lateral edges of the film; each flange consisting of a disk and a circumferential lip; a pair of lips formed on the disks along peripheries thereof to project face to face with each other for contact with edges of an outermost turn of the film so as to prevent the film from loosening; and means for pressing partly the flanges against the film in order to clamp partly both side faces of the film in a state with the flanges out of the vertical relative to the spool. Both lateral sides of the leading end portion are cut off so as to determine an interval between the lateral edges of the film to be smaller than an interval between circumferential edges of the lips opposing in a state where the flanges are in contact with the side faces of the film. The film is prevented from loosening without irrecoverable deformation of the flanges.

In accordance with a preferred embodiment, a pair of spreading projections are formed on an inside of the cassette shell in positions close to the film passageway for projecting to be in contact with circumferential edges of the lips. The spreading projections and a pair of ridges constituting pressing means keep the flanges out of the vertical relative to the spool. Contact surfaces of the pair of ridges and the flanges in contact with each other and contact surfaces of the spreading projections and the lips in contact with each other are previously processed with embossing. The spool can be rotated even by applying a small rotary torque thereto.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
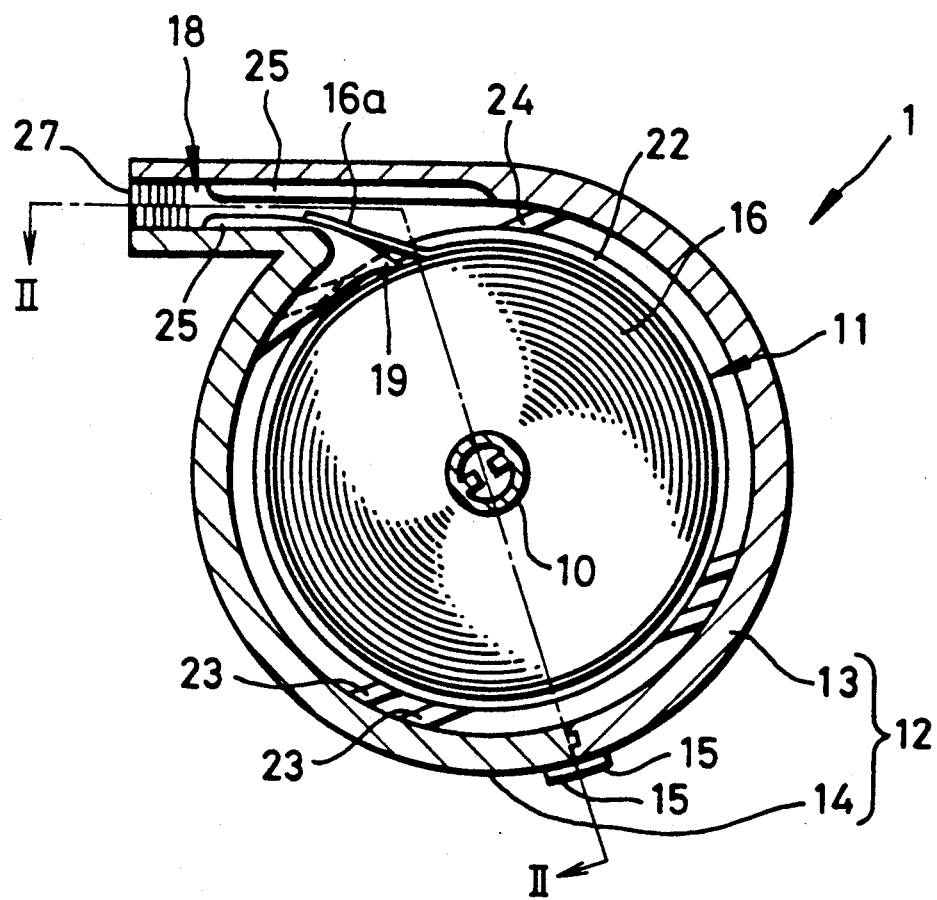
FIG. 1 is a section view illustrating a film cassette in accordance with a preferred embodiment of the present invention.
Figure 2:
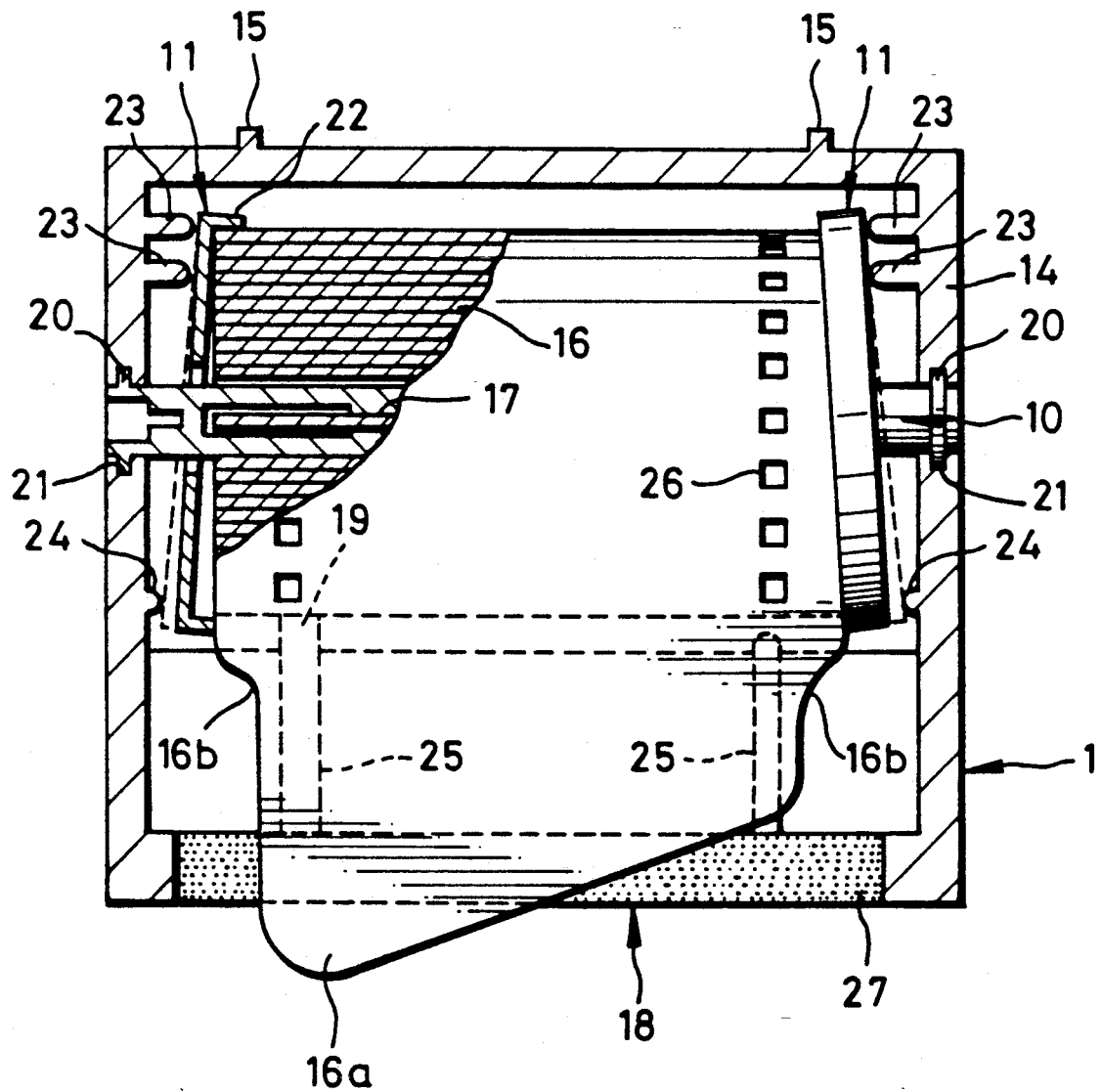
FIG. 2 is a section view illustrating the film illustrated in FIG. 1, taken along line II—II of FIG. 1.

In FIGS. 1 and 2 illustrating a photographic film cassette 1 according to the present invention, the film cassette 1 consists of a spool 10, a pair of flanges 11, and a cassette shell 12 for containing them in a light-tight fashion. The cassette shell 12 is constituted by upper and lower shell halves 13 and 14 separated along a juncture indicated as line II-II in FIG. 1, which shell halves are molded from plastics each integrally, and joined together in a light-tight fashion by use of an ultrasonic welding or the like. A positioning tool or jig is used for holding the two shell halves 13 and 14 in a joined state for welding. The outsides of the two shell halves 13 and 14 are provided with respectively two positioning ridges 15 for positioning the two shell halves 13 and 15 on the positioning tool. The ends of the spool 10 do not project from the cassette shell 12, but are included in the outline of the cassette shell 12 underneath so as to prevent a user from rotating the spool 10 only with his fingers.

A trailing end portion of the film 16 is fixedly inserted in a groove 17 of the spool 10, about which the film 16 is wound. A leading end portion 16a of the film 16 has a width smaller than that of the film 16. A stepped portion thus formed by changing the width of the film constitutes curved edges 16b of a smooth curve at a radius of 5 mm or more. A separation claw 19 is provided on the film passageway 18 in order to separate the leading end portion 16a from the outermost turn of the film 16, which is wound in a roll on spool 10. For the time of separation, the front end of the leading end portion 16a is cut in an oblique fashion so as to prevent jamming of the leading end portion 16a.

The flanges 11 are formed in a manner separate from the spool 10, around which spacings are defined in the openings of the flanges 11. Openings for rotatably supporting the spool 10 on the cassette shell 12 require a construction which will shield light. Collars 20 formed on both ends of the spool 10 are inserted in annular grooves 21 on each of the two shell halves 13 and 14. Each flange consists of a disk and a circumferential lip. The flanges 11 are disposed between the collars 20. Lips 22 are formed on the periphery of the disks of the flanges 11 to project in directions facing each other, and serve to prevent the outermost turn of the film 16 from loosening.

Two ridges 23 formed on the inside of the cassette shell 12 contact the flanges 11 causing the flanges to deviate from a vertical position relative to a horizontal position of spool 10. The ridges project on inner lateral walls around the openings having the annular grooves 21 toward the flanges 11, and define a straight line intersecting vertically the juncture indicated by line II—II in FIG. 1. The ridges 23 are in contact with the surfaces of the flanges 11 that are opposite the lips 22, and press the flanges 11 toward a position to clamp the outermost turn of the film 16 wound on the spool. The circumferential edges of the lips 22 in the state with the flanges 11 pressed by the ridges 23 are spaced at a distance slightly larger than the width of the leading end portion 16a, which is therefore free from the lips 22 and separated from the outermost turns of the wound film 16 by the separation claw 19 at the time of advancing the film 16.

A pair of ridges 24 are formed in the vicinity of the film passageway 18 and project from the inner lateral walls of the two shell halves 13 and 14 in the direction toward the flanges 11 in a manner similar to the ridges 23. The projecting height of the ridges 24 is set to be smaller than that of the ridges 23. The ridges 24 restrict the spreading between the flanges 11 in the vicinity of the film passageway 18 so as to prevent an excessive loosening of the wound film 16. When the outer surfaces of the flanges 11 are in contact with the ridges 24, the interval between the circumferential edges of the lips 22 are larger than the width of the film 16, so that the film 16 is allowed to be separate in the vicinity of the film passageway 18 and not be covered by the lips 22, whereas the flanges 11 are movably disposed out of the vertical relative to the spool 10.

As used herein the phrase "out of the vertical", and the like, when used to describe the orientation of the flanges 11, means that the flanges do not form right angles with the axis of the spool or wound film. The phrase is used as a convenient description with reference to a horizontally positioned spool or wound film.

The inside horizontal surfaces of the film passageway 18 as illustrated in FIG. 2 are provided with passage ridges 25 projecting from the upper and lower surfaces.

The passage ridges 25 extend in the direction of passing the film 16 and are positioned in correspondence with the disposition of perforations 26 of the film 16. When the film 16 passes through the film passageway 18, it is in contact with the passage ridges 25 in the position of the perforation 26 to protect image frames in exposure. A conventional plush material 27 is provided with the film passageway 18 for trapping light entering the film passageway 18.

The operation of the embodiment as constructed above is now described. To advance the leading end portion 16a of the film 16 to the outside of the cassette shell 12, the spool 10 is rotated leftward in FIG. 1. The leading end portion 16a is separated by the separation claw 19 and is directed to the film passageway 18. Further rotation of the spool 10 brings the curved edges 16b of the film 16 in contact with the circumferential edges of the lips 22, which are pushed outward to spread the interval between the flanges 11 until their outer surfaces come near to the ridges 24. The distance between the circumferential edges of the lips 22 becomes greater than the width of the film 16, which is released from the restriction of the lips 22 and is advanced to the outside of the cassette shell 12 through the film passageway 18.

To wind up the film 16 drawn out of the cassette shell 12, the spool 10 is rotated rightward. The film 16 is wound up in contact with the passage ridges 25 coming in contact with the perforations 26, whereby the image frames on the film 16 will not be scratched or damaged.

When the wound film 16 is loosened during advance or wind-up, the outermost turn of the film 16 presses the inner side of the lips 22 so that the friction between the film 16 and the lips 22 causes the flanges 11 to rotate. The loosening of the outermost turn of the film 16 therefore causes the flanges 11 to rotate, making it possible to advance/wind up the film 16.

It is noted that the ridges 23 and 24 are formed in a disposition of lines vertical to the juncture between the two shell halves 13 and 14, so that each of the shell halves 13 and 14 can be molded in a manner integral with the ridges 23 and 24. Moreover, the precision is improved in forming the plane surfaces of the inner lateral walls of the cassette shell 12.

The present embodiment is provided with the collars 20 formed in both inner lateral walls of the cassette shell 12 in the vicinity of both ends of the spool 10. Such a light shielding construction may be alternatively that in which gaps defined in the openings of the cassette shell 12 around the spool 10 are bent in the direction vertical to the spool 16.

The spool 10, the flanges 11 and the cassette shell 12 are formed from different kinds of material, because they might be welded together by a frictional heat generated by their sliding movement at the time of ultrasonic sealing if they were formed from one material. It is possible to use or reuse the spool 10 and the flanges 11 for a long time. The cost for manufacturing the cassette 1 is reduced.

Figure 3:
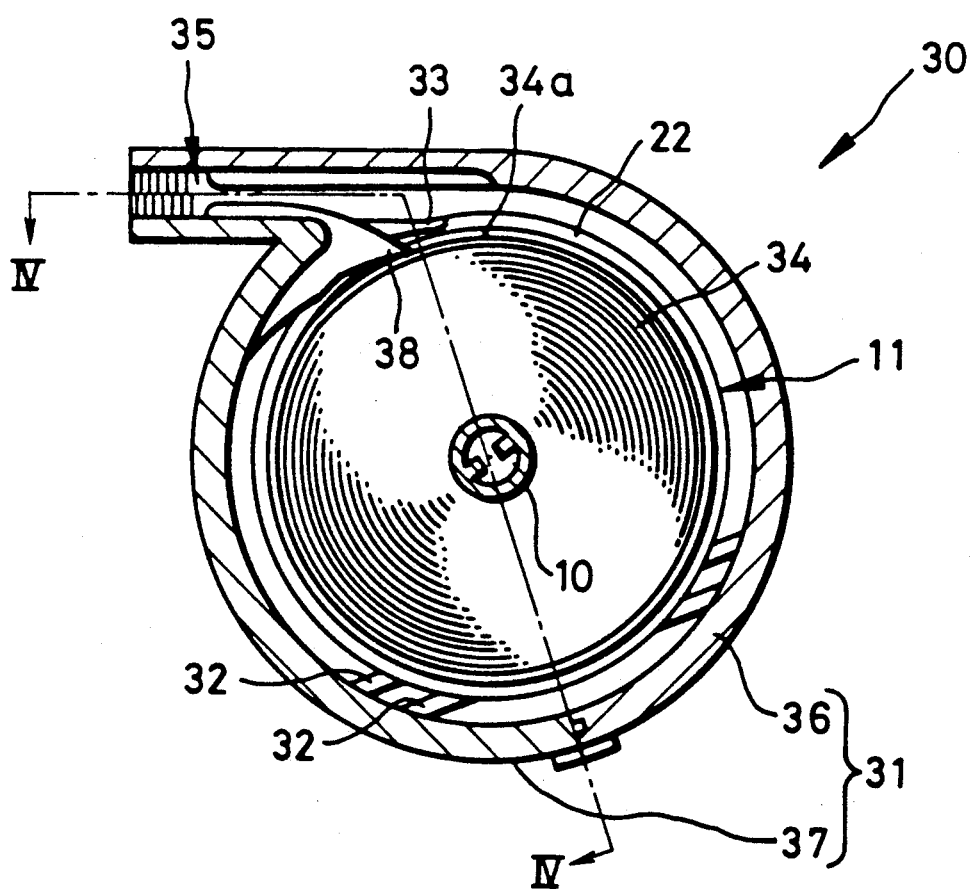
FIG. 3 is a section view illustrating a film cassette in accordance with another preferred embodiment of the present invention.
Figure 4:
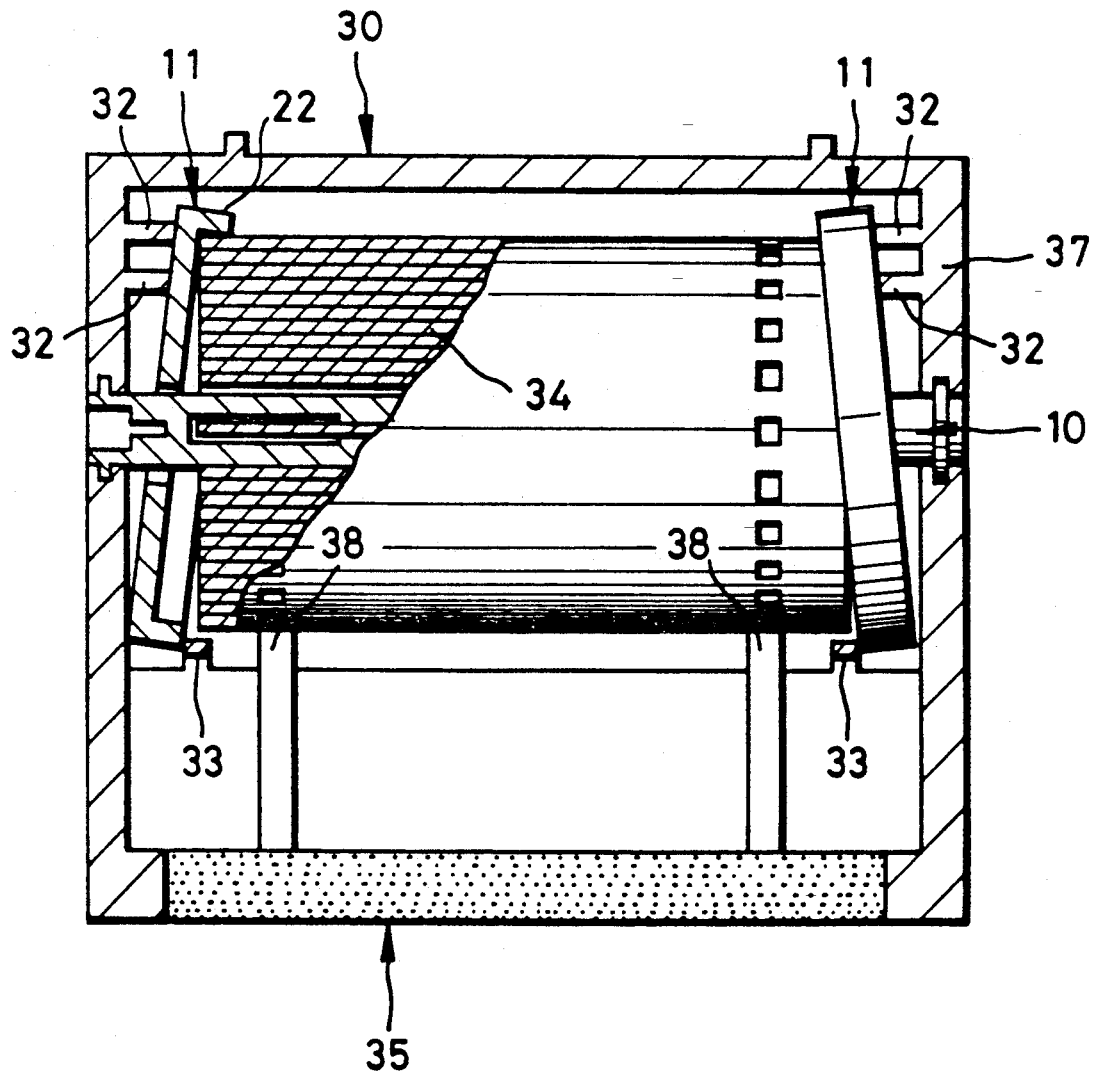
FIG. 4 is a section view illustrating the film cassette illustrated in FIG. 3, taken along line IV—IV of FIG. 3.

A film cassette 30 according to another preferred embodiment of the present invention is described referring to FIGS. 3 and 4. A cassette shell 31 of the film cassette 30 is provided with ridges 32 and spreading projections 33, so that the flanges 11 are supported out of the vertical relative to the spool 10 in order to let out a leading end portion 34a of photographic film 34 through a film passageway 35. The ridges 32 are similar to the above ridges 23, project from the inner lateral walls of upper and lower shell halves 36 and 37 toward the flanges 11 in order to press the flanges 11 toward a position to clamp the outermost turn of the would film 34, and define straight lines intersecting vertically the juncture indicated by line IV—IV in FIG. 3.

The two spreading projections 33 are formed in the positions where the film 34 comes near to the film passageway 35, and where they are in contact with the lips 22 of the flanges 11 so as to keep the separation between the circumferential edges of the lips 22 greater than the width of the film 34. The film 34 is prevented from loosening by the lips 22 and is released by the spreading projections 33 in a position close to the film passageway 35. The flanges 11 are still rotatably supported out of the vertical relative the spool 10. It is preferable in order to reduce friction that a processing of embossing, or forming irregularities of a size approximately from 10 to 30 um is effected on the whole contact surfaces between the ridges 32 and the flanges 11 and those between the spreading projections 33 and the lips 22.

In the film cassette 30 as constructed above, the leftward rotation of the spool 10 causes separation claws 38 to separate the leading end portion 34a of the film 34 to feed it to the outside of the cassette shell 31 through the film passageway 35. It is noted that the interval defined between the interior circumferential surface of the cassette shell 31 and the periphery of the flanges 11 is determined to be approximately 0.2 mm, so that the leading end portion 34a of the film 34 can be rotated while the leading end portion 34a is separate from the lips 22 of the flanges 11.

An experiment was conducted to measure a rotary torque to rotate the spool 10 for advancing the leading end portion 34a of the film 34 from the cassette shell 31 containing the film 34. The measured torque was 220 g·cm, which is a value considerably smaller than 350 g·cm, a value measured by applying the conventional film cassette described as a prior art.

Another experiment was conducted with respect to this cassette subjected to a processing of embossing. A measured value 170 g·cm was obtained. A torque which is half as large as that required for the conventional cassette is sufficient to rotate the spool 10, so that the cost for manufacturing a film feeding mechanism of a camera can be highly reduced.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic film cassette in which photographic film is contained in a light-tight fashion, comprising:
    a cassette shell provided with a film passageway through which said film is passed;
    a spool disposed in said cassette shell for winding said film in a roll thereabout;
    a pair of flanges rotatably and pivotally supported on said spool in positions close to both ends of said spool for defining positions of both lateral edges of said film wound in a roll;
    each of said flanges having a circumferential lip formed along a peripheral edge thereof, said lip projecting inwardly for contact with edges of an outermost turn of said film wound about said spool so as to prevent said film from loosening; and
    means for pivoting said flanges with respect to an axis of rotation of said spool such that said flanges contact said film wound in a roll to clamp opposite side faces of said film wound in a roll.

2. A photographic film cassette as defined in claim 1, wherein said pivoting means is positioned within said cassette such that said flanges are clamped at a location substantially opposite to said film passageway.

3. A photographic film cassette as defined in claim 2, further comprising separating means provided in said cassette shell for separating a leading end portion of said film from said film wound in a roll in order to advance said leading end portion through said film passageway when said spool is rotated in a direction of unwinding said film.

4. A photographic film cassette as defined in claim 3, wherein said cassette shell includes two shell components each molded integrally.

5. A photographic film cassette as defined in claim 4, wherein said two shell components are two shell halves parted with respect to a juncture which passes through a center of said spool and then follows said film passageway.

6. A photographic film cassette as defined in claim 5, wherein said pivoting means comprises a first set of ridges formed on inner lateral walls of said cassette shell, said first set of ridges abutting said flanges.

7. A photographic film cassette as defined in claim 6, wherein both lateral sides of said leading end portion of said film are cut off so as to determine an interval between said lateral edges of said film to be smaller than an interval between circumferential edges of said lips in a state where said flanges are in contact with said side faces of said film wound in a roll.

8. A photographic film cassette as defined in claim 7, further comprising a second set of ridges formed on said inner lateral walls of said cassette shell, said second set of ridges abutting said flanges in order to restrict a degree to which said flanges are pivoted open in a vicinity of said film passageway.

9. A photographic film cassette as defined in claim 8, wherein said first and second sets of ridges extend linearly in a direction perpendicular to said juncture between said two shell halves.

10. A photographic film cassette as defined in claim 9, wherein said lateral edges of said film are provided with smoothly curved portions between said lateral sides of said leading end portions and lateral sides of a portion of said film having no cutoff.

11. A photographic film cassette as defined in claim 10, wherein said separating means comprises at least one separating claw formed in an innermost position of said film passageway.

12. A photographic film cassette as defined in claim 11, wherein said leading end portion forms a shape which is cut obliquely with respect to a feeding direction of said film.

13. A photographic film cassette as defined in claim 12, further comprising:
    annular grooves formed along inner peripheries of openings formed on both lateral walls of said cassette shell for supporting said spool; and
    spool supporting portions formed on said spool in positions corresponding to said annular grooves for contact with said annular grooves in order to shield spaces, formed between said spool and said flanges, from light.

14. A photographic film cassette as defined in claim 13, further comprising a passage ridge formed on said film passageway along said film feeding direction for reducing friction between said film and said film passageway thereby protecting a surface of said film.

15. A photographic film cassette as defined in claim 6, further comprising a pair of spreading projections formed on an inside of said cassette shell in positions close to said film passageway and projecting in a direction to be in contact with circumferential edges of said lips, said spreading projections and said first set of ridges maintaining said flanges in a pivoted position relative to said spool.

16. A photographic film cassette as defined in claim 15, wherein contact surfaces between said first set of ridges and said flanges, and contact surfaces between said spreading projections and said lips, have embossing thereon.

17. A photographic film cassette as defined in claim 16, wherein said first set of ridges are formed linearly in a direction perpendicular to said juncture between said two shell halves.

18. A photographic film cassette as defined in claim 17, wherein said separating means comprises at least one separating claw formed in an innermost position of said film passageway.

19. A photographic film cassette as defined in claim 18, further comprising:
    annular grooves formed along inner peripheries of openings formed on both lateral walls of said cassette shell for supporting said spool; and
    spool supporting portions formed on said spool in positions corresponding to said annular grooves for contact with said annular grooves spacings in order to shield spaces, formed between said spool and said flanges, from light.

20. A photographic film cassette as defined in claim 19, further comprising a passage ridge formed on said film passageway along said film feeding direction for reducing a friction between said film and said film passageway thereby protecting a surface of said film.

21. A photographic film cassette in which photographic film is contained in a light-tight fashion, comprising:
    a cassette shell provided with a film passageway through which said film is passed;
    a spool disposed in said cassette shell for winding said film in a roll thereabout;
    a pair of flanges rotatably and pivotally supported on said spool in positions close to both ends of said spool for defining positions of both lateral edges of said film wound in a roll;
    a pair of circumferential lips formed on said flanges along peripheries thereof to project face to face with each other for contact with edges of an outermost turn of said film wound about said spool so as to prevent said film from loosening, a leading end portion of said film being cut so that said film is smaller in width at said leading end portion than a distance between circumferential edges of said lips when said flanges are in contact with said side faces of said film wound in a roll; and
    pivoting means for pivoting said flanges with respect to an axis of rotation of said spool such that said flanges about against said film wound in a roll to clamp opposite side faces of said film wound in a roll.

22. A photographic film cassette as defined in claim 21, further comprising means provided on an inside surface of said cassette shell so as to abut said flanges in order to restrict a degree to which said flanges are pivoted open in a vicinity of said film passageway.

23. A photographic film cassette comprising:
    a cassette shell provided with a film passageway through which said film is passed;
    a spool disposed in said cassette shell for winding said film in a roll thereabout;
    a pair of flanges rotatably provided on said spool in positions close to both ends of said spool for defining positions of both lateral edges of said film wound in a roll;
    a pair of circumferential lips formed on said flanges along peripheries thereof to project face to face with each other for contact with edges of an outermost turn of said film wound about said spool so as to prevent said film from loosening;
    first pivoting means for pivoting said flanges with respect to an axis of rotation of said spool such that said flanges abut against said film wound in a roll to clamp opposite side faces of said film wound in a roll; and
    second pivoting means provided within said cassette shell for pivoting said flanges with respect to an axis of rotation to said spool, inner, circumferential edges of said lips being separated to release said film from said lips in positions close to said film passageway.

* * * * *